G. A. ENSIGN & J. C. M. DES ISLETS.
SPOKE MITERING MACHINE.
APPLICATION FILED JULY 21, 1917.

1,248,095.

Patented Nov. 27, 1917.
6 SHEETS—SHEET 1.

WITNESSES
Edw. Thorpe

INVENTORS
George A. Ensign
John C. M. Des Islets
BY
Munn & Co.
ATTORNEYS

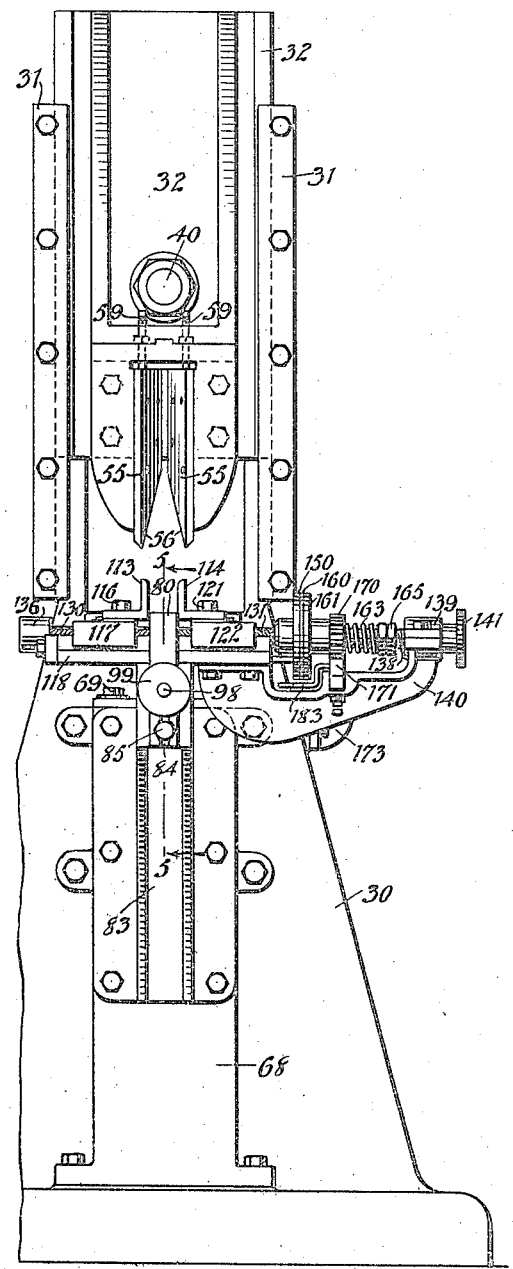
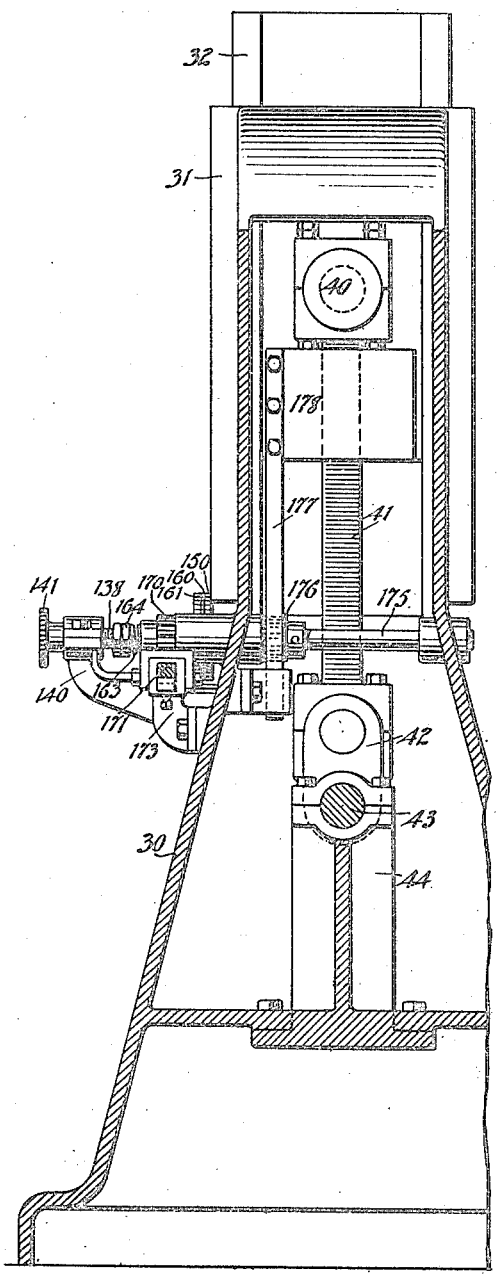

G. A. ENSIGN & J. C. M. DES ISLETS.
SPOKE MITERING MACHINE.
APPLICATION FILED JULY 21, 1917.
1,248,095.
Patented Nov. 27, 1917.
6 SHEETS—SHEET 3.
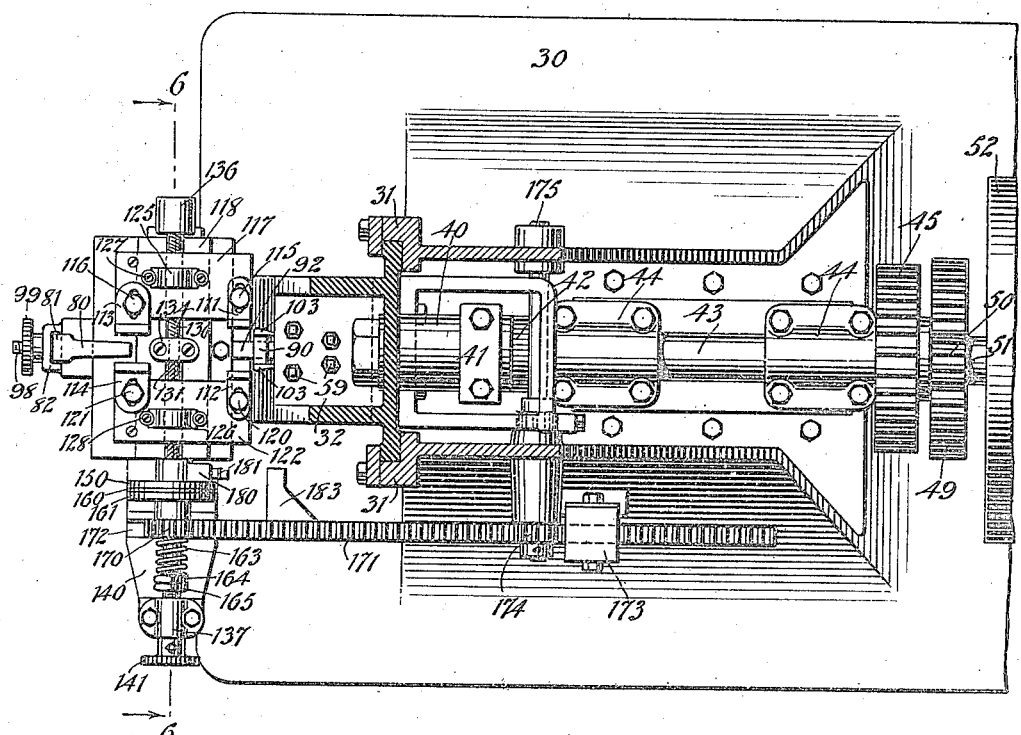
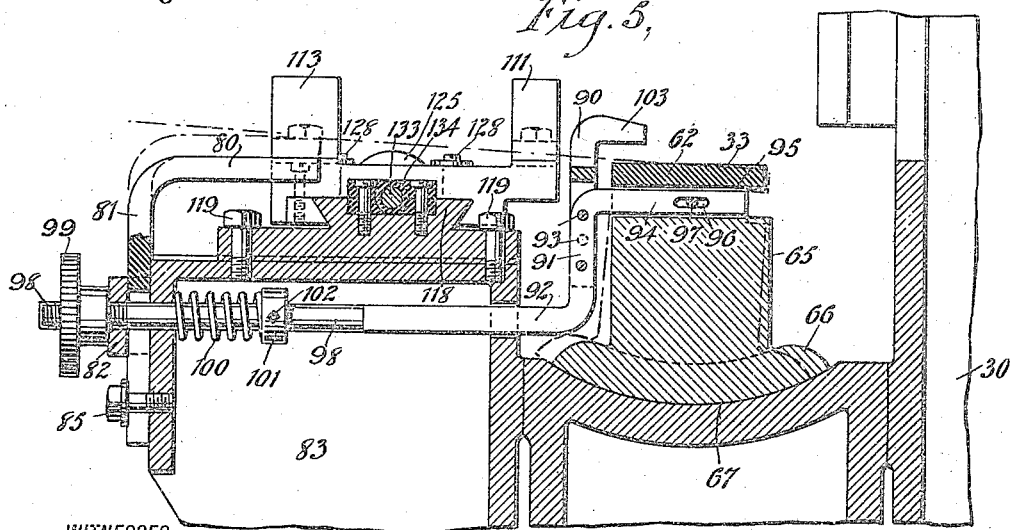

G. A. ENSIGN & J. C. M. DES ISLETS.
SPOKE MITERING MACHINE.
APPLICATION FILED JULY 21, 1917.
1,248,095.
Patented Nov. 27, 1917.
6 SHEETS—SHEET 4.
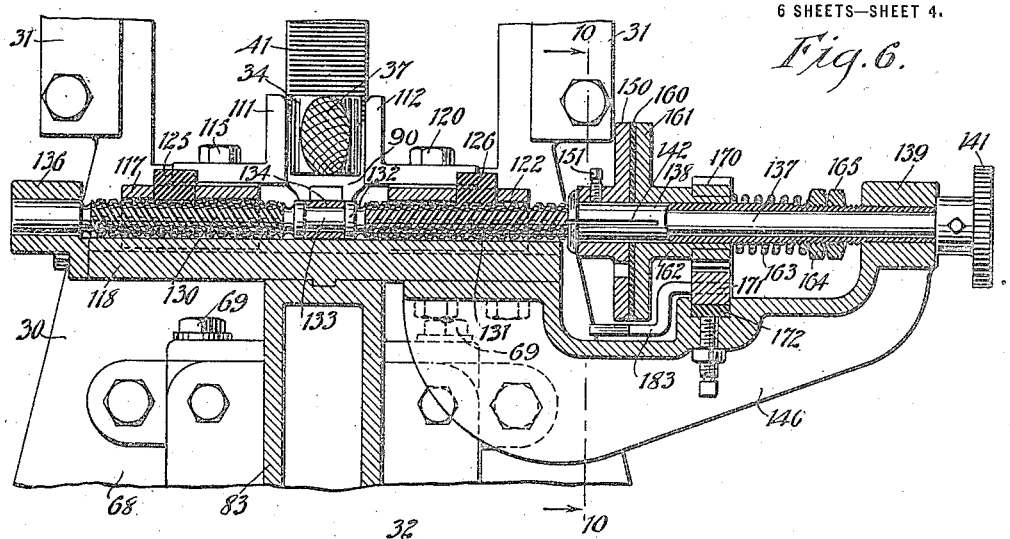
Fig. 6.
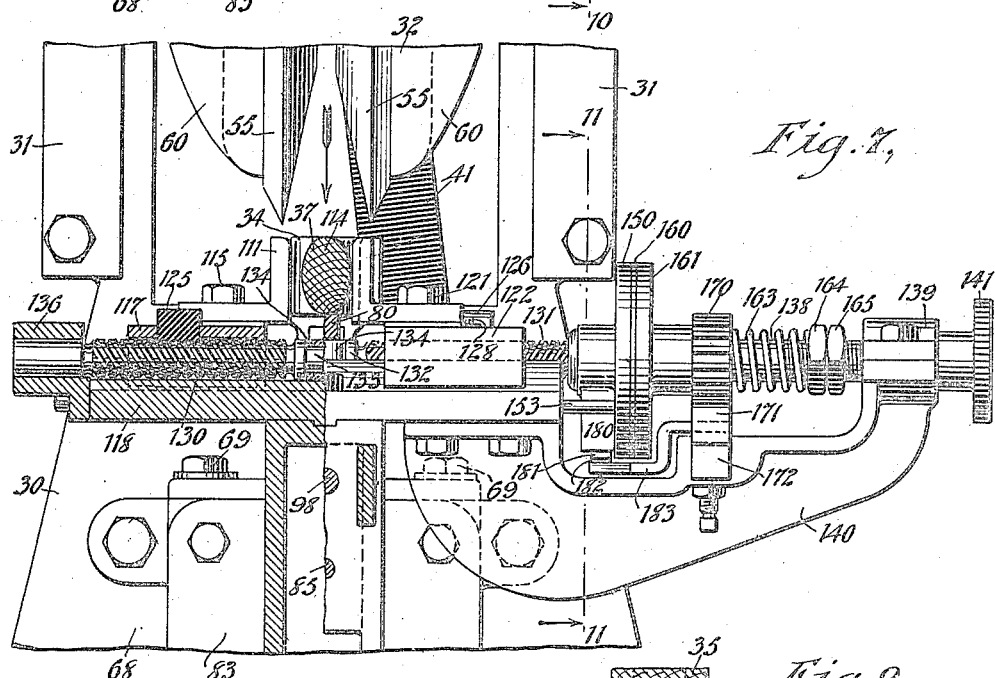
Fig. 7.
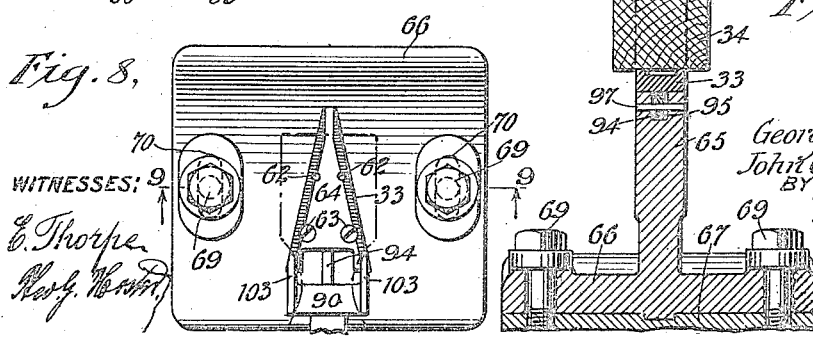
Fig. 8.
Fig. 9.
WITNESSES:
E. Thorpe
Geo. J. Howitt
INVENTORS
George A. Ensign
John C. M. Des Islets
BY
Munn & Co.
ATTORNEYS

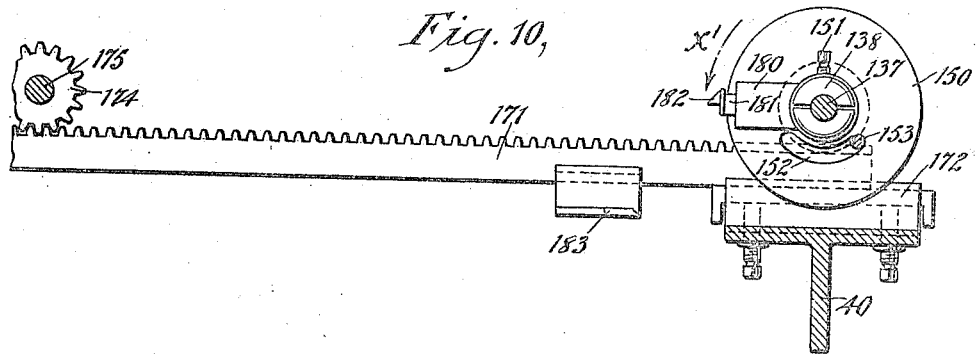
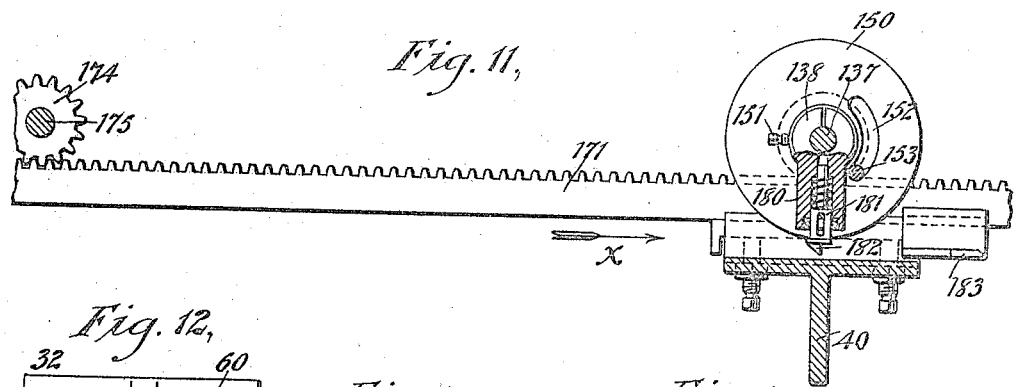
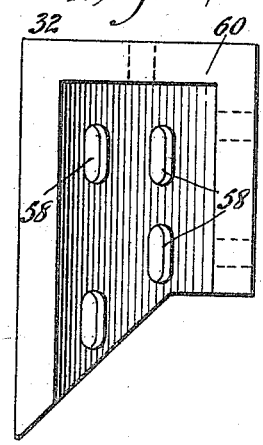
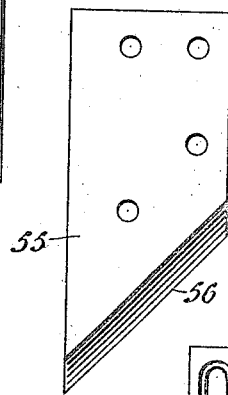
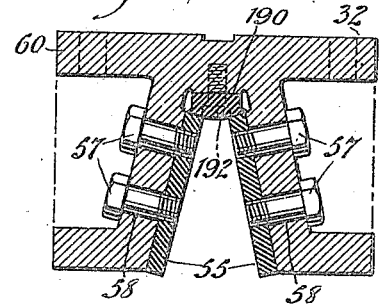
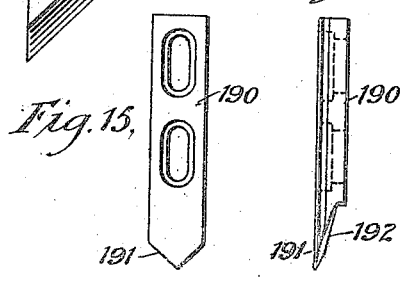

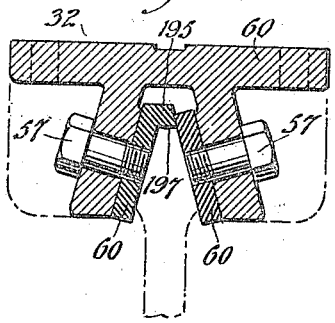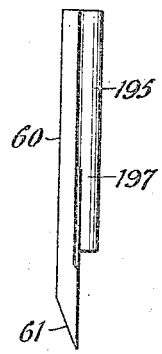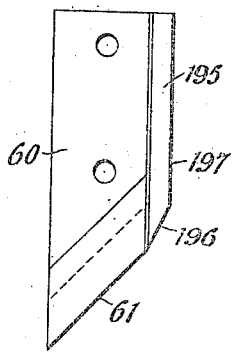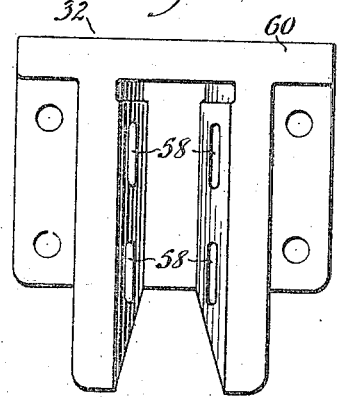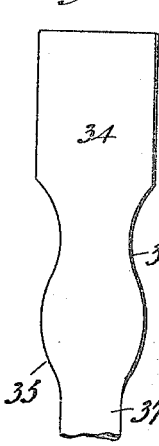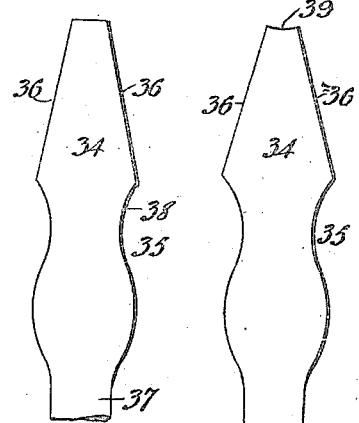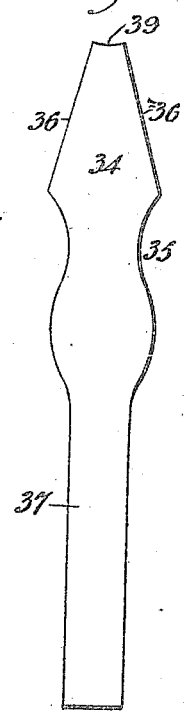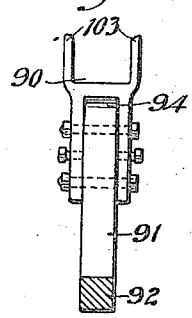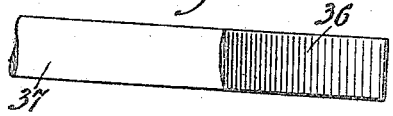

UNITED STATES PATENT OFFICE.

GEORGE A. ENSIGN AND JOHN C. M. DES ISLETS, OF DEFIANCE, OHIO, ASSIGNORS TO DEFIANCE MACHINE WORKS, OF DEFIANCE, OHIO, A CORPORATION OF OHIO.

SPOKE-MITERING MACHINE.

1,248,095.   Specification of Letters Patent.   Patented Nov. 27, 1917.

Application filed July 21, 1917. Serial No. 181,978.

*To all whom it may concern:*

Be it known that we, GEORGE A. ENSIGN and JOHN C. M. DES ISLETS, both citizens of the United States, and residents of Defiance, in the county of Defiance and State of Ohio, have invented a new and Improved Spoke-Mitering Machine, of which the following is a full, clear, and exact description.

The invention relates to woodworking machines, and its object is to provide a new and improved spoke mitering machine designed to simultaneously miter or bevel both sides of the hub end of a spoke. Another object is to allow of running the machine at a high speed to insure accurate mitering of a large number of spokes in a comparatively short time and without danger of injury to the attendant of the machine.

In order to accomplish the desired result, use is made of a reciprocating cutter head having converging cutting edges and a stationary anvil die for the hub end of a spoke to rest on and having converging sides coöperating with the said cutting edges to cut off the surplus material simultaneously on both sides of the said hub end of the spoke. Use is also made of a clamping device in front of the anvil die and adapted to clamp the shank of the spoke in position while the hub end thereof rests on the anvil die, the said clamping device being controlled by the said reciprocating cutter head.

A practical embodiment of the invention is represented in the accompanying drawings forming a part of this specification, in which similar characters of reference indicate corresponding parts in all the views.

Fig. 2 is a front elevation of the same;

Fig. 3 is a cross section of the same on the line 3—3 of Fig. 1;

Fig. 4 is a sectional plan view of the same on the line 4—4 of Fig. 1;

Fig. 5 is an enlarged sectional side elevation of the clamping device, the anvil and the spoke holder and gage;

Fig. 6 is an enlarged cross section of the clamping device, the section being on the line 6—6 of Fig. 4, and the parts being shown in position prior to closing the clamping jaws;

Fig. 7 is a similar view of the same with the jaws in closed clamping position and the cutter head in position immediately prior to reaching the hub end of the spoke, parts being shown in elevation;

Fig. 8 is an enlarged plan view of the anvil die;

Fig. 9 is a cross section of the same on the line 9—9 of Fig. 8, and with the hub end of the spoke in position on the anvil die;

Fig. 10 is a rear sectional elevation on the line 10—10 of Fig. 6, and showing more particularly the actuating friction mechanism for the clamping jaws used for holding the spoke in position during the cutting operation;

Fig. 11 is a similar view of the same with the parts in a different position, the section being on the line 11—11 of Fig. 7;

Fig. 12 is an enlarged side elevation of the cutter head body;

Fig. 13 is a face view of one of the cutter head knives;

Fig. 14 is a sectional plan view of a cutter head provided with a trimming knife for the end of the spoke;

Fig. 15 is a face view of such trimming knife;

Fig. 16 is an edge view of the same;

Fig. 17 is a sectional plan view of a modified form of the cutter head;

Fig. 18 is a front elevation of the body for the cutter head shown in Fig. 17;

Fig. 19 is an edge view of one of the knives of the cutter head shown in Fig. 17;

Fig. 20 is a face view of the same;

Fig. 21 is a cross section of the spoke holder and gage used to facilitate the placing of the spoke in position on the anvil die and to hold the spoke against lateral movement and to gage the spoke relative to the anvil die;

Fig. 22 is a plan view of the spoke to be mitered at its hub end;

Fig. 23 is a similar view of the spoke after being mitered;

Fig. 24 is a similar view of the spoke mitered and trimmed at the terminal of its hub end;

Fig. 25 is a side elevation of the mitered spoke for a straight wheel; and

Fig. 26 is a similar view of a spoke for a dished wheel.

Figure 1:
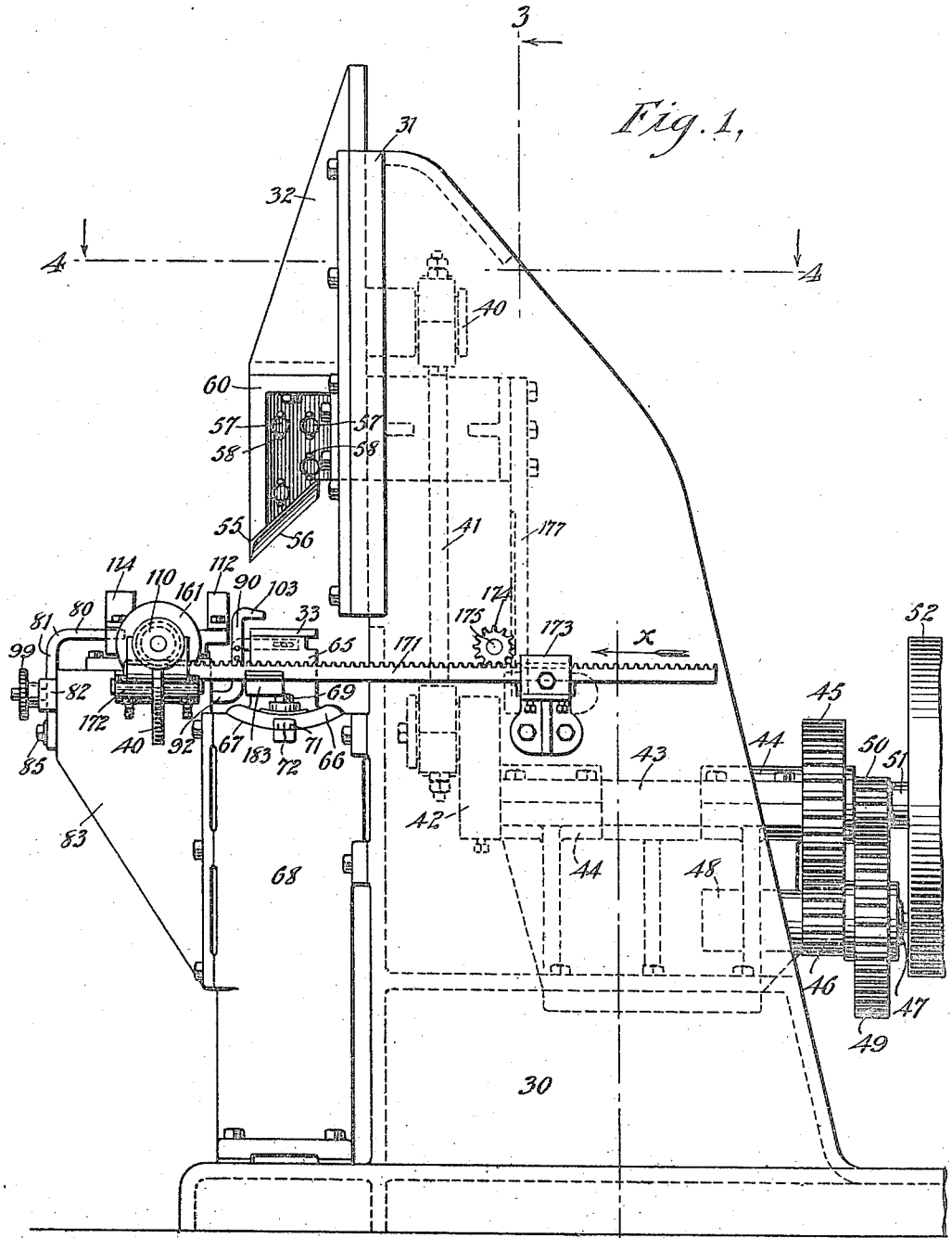
Figure 1 is a side elevation of the mitering machine.

Heretofore the mitering of the hub ends of the spokes of automobile wheels or other wheels was usually accomplished by passing the hub end of the spoke between two revolving cutter heads, each having a plurality of knives grouped around the axis of the cutter head, each knife extending in a plane parallel to the axis of the cutter head and with the cutting edges inclined to such axis. This process of forming the miter was comparatively slow as the knives gradually cut off the surface material of the hub end of the spoke. With the improved mitering machine presently to be described in detail the mitering is done by a single shearing cut of a reciprocating V-shaped knife thereby producing an accurate, clean, smooth miter requiring no further treatment and insuring an accurate fitting in the wheel hub with the arches at the throat in perfect harmony to enhance the appearance of the wheel.

The spoke mitering machine is mounted on a suitably constructed frame 30 provided with vertical guideways 31 in which is mounted to slide up and down a cutter head 32 coacting with an anvil die 33 for shearing off the surplus material simultaneously on both sides of the hub end 34 of a spoke 35 to form the mitered sides 36, as hereinafter more fully explained. The cutter head 32 is provided with a pin 40 connected by a pitman 41 with a crank 42 on the forward end of a shaft 43 extending longitudinally and journaled in suitable bearings 44 attached to the main frame 30. On the rear end of the shaft 43 is secured a gear wheel 45 in mesh with a pinion 46 secured on a short shaft 47 journaled in a bearing 48 mounted on the main frame 30. On the shaft 47 is secured a gear wheel 49 in mesh with a pinion 50 secured on a shaft 51 journaled in suitable bearings (not shown), and on the said shaft 51 is secured a pulley 52 connected by belt with other machinery for imparting a continuous rotary motion to the shaft 51 which by the gearing just described imparts a powerful though slower turning movement to the shaft 43 which by the crank 42 and the pitman 41 imparts an up and down reciprocating motion to the cutter head 32.

The cutter head 32 is provided with two vertical converging knives 55 having their cutting edges 56 inclined upwardly and rearwardly, as plainly indicated in Figs. 1, 2 and 7. The cutting edges 56 produce shearing cuts on the sides of the hub end 34 of the spoke 35, as hereinafter more fully explained. The knives 55 are adjustably secured to the cutter head 32 by bolts 57 screwing in the knives 55 and extending through elongated slots 58 formed in the cutter head, as plainly shown in Fig. 12. On loosening the bolts 57 the knives 55 can be moved up or down to insure a shearing off of the surplus material on the sides of the hub end 34 of a spoke throughout the thickness of the said hub end during the downward movement of the cutter head 32. It will also be noticed that by this arrangement the knives 55 can be readily adjusted after grinding the cutting edges 56 thereof. The upper edges of the knives 55 abut against set screws 59 screwing in the cutter head, as indicated in Fig. 2, and these set screws serve to aid in the vertical adjustment of the knives 55. In practice, the knives 55 are attached to a holder 60 bolted or otherwise fastened to the body of the cutter head 32. The cutting edges 56 operate in conjunction with the obliquely disposed sides of the anvil die 33, as will be readily understood by reference to Fig. 8. The anvil die 33 is removably secured by screws 63 and dowel pins 64 to the die body 65 provided with a segmental base 66 fitting onto a correspondingly shaped seat 67 formed on a support 68 bolted or otherwise fastened to the main frame 30. The base 66 is fastened by bolts 69 to the seat 67 of the support 68, and the said bolts extend through slots 70 formed in the base 66 and extending longitudinally, as plainly indicated in Fig. 8. On loosening the bolts 69, the base 66 and with it the body 65 and the anvil die 33 can be tilted in a longitudinal direction with a view to move the anvil die 33 from a normal horizontal position into a slightly inclined position, as indicated in dotted lines in Fig. 5. It is understood that when the anvil die 33 is in normal horizontal position, the miters 36 produced on the hub end 34 are for spokes used in straight wheels, and when the anvil die 33 is inclined or tilted then the spokes produced are for use in forming dished wheels. It is further understood that when the anvil die 33 is in normal horizontal position it is at a right angle to the line of movement of the cutter head 32 and the spokes produced are for use in straight wheels. When the anvil die 33 is tilted it stands at a lesser angle to the line of movement of the cutter head 32. The base 66 of the anvil die 33 is provided with a graduation 71 (see Fig. 1) indicating at a mark 72 formed on the support 68 to enable the user of the machine to readily set the anvil die 33 to horizontal or to a desired inclined or tilted position, according to the dish to be given to the wheel.

The shank 37 of the spoke 35 mitered at the time rests on a support 80 provided with a downwardly extending arm 81 engaging a bearing 82 formed on a bracket 83 bolted or otherwise secured to the support 68. The arm 81 is provided with a slot 84 through which extends a bolt 85 serving to fasten the arm 81 adjustably to the bracket 83. On loosening the bolt 85 the support 80 can be raised or lowered to locate the top of the support 80 in the plane of the top of the anvil die 33 with a view to support the spoke in a horizontal position. When a spoke is to be cut while in tilted position the support 80 is correspondingly raised or replaced by another to support the spoke in the inclined position, as indicated in dotted lines in Fig. 5.

In order to facilitate the placing of the spoke in correct position on the anvil die 33 and the spoke support 80, use is made of a combined gage and holder 90 located adjacent the anvil die 33 and removably fastened to the vertical member 91 of a rod 92 by the use of bolts 93. The rod 92 is provided with a forwardly extending arm 94 fitting into a slot formed in the top of the body 65 of the anvil die 33 (see Figs. 5 and 9). The arm 94 is provided with a slot 96 through which extends a pin 97 held on the body 65 to allow longitudinal movement of the rod 92 but to hold the same against up and down movement. The rod 92 terminates in a round portion 98 slidably mounted in the bracket 84 and provided at its outer threaded end with a nut 99 screwing against the bearing 82 of the bracket 83. A spring 100 is coiled on the round end 98 of the rod 92 and rests with one end on the bracket 83 and with its other end on a collar 101 adjustably secured by a set screw 102 to the end 98 of the rod 92. On turning the nut 99, the rod 92, and consequently the combined gage and holder 90, can be readily adjusted nearer to or farther from the anvil die 33. The combined gage and holder 90 is preferably in the form of a fork provided with forwardly extending flanges 103 adapted to engage opposite sides of the throat 38 of the spoke 35 to permit the operator to quickly locate the hub end 34 of the anvil die 33 to hold the spoke against accidental longitudinal or lateral movement. By the arrangement described the operator is enabled to quickly engage the throat of a spoke with the flanges 103 of the combined gage and holder 90 to gage the hub end 34 relative to the anvil die 33 to insure a uniform mitering of the hub ends 34 of the spokes 35 by the knives 55 of the cutter head 32.

The shank 37 of the spoke 35 in position at the time on the anvil die 33 and the support 80 is firmly clamped in this position by the use of a clamping device 110 operating in unison with the cutter head 32 to hold the spoke in clamped position during the shearing off of the surplus material on the sides of the hub end 34 by the knives 55 of the cutter head and to unclamp the shank 37 of the spoke during the ascent of the cutter head to allow convenient removal of the mitered spoke and the placing of the next spoke to be mitered in position prior to the next descent of the cutter head 32. The clamping device 110 comprises a pair of clamping jaws 111, 112, and a second pair of clamping jaws 113, 114, and the said clamping jaws 111 and 113 are adjustably secured by screws 115 and 116 to a jaw base 117 mounted to slide transversely on a suitable guideway 118 fastened by bolts 119 (see Fig. 5) to the top of the bracket 83. The jaws 112 and 114 are similarly fastened by bolts 120, 121 to a jaw base 122 likewise mounted to slide transversely on the guideway 118. The jaw bases 117, 122 are provided with half nuts 125, 126 fastened in place on the jaw bases by screws 127 and engaging left-hand and right-hand screw threads 130, 131 formed on a screw rod 132 extending transversely and mounted to turn at its middle non-threaded portion 133 in a bearing 134 fastened to the guideway 118 intermediate the jaw bases 117, 122. The left-hand non-threaded portion of the screw rod 132 is journaled in a bearing 136 attached to the guideway 118. The right-hand end of the screw rod 132 has a reduced portion 137 on which fits a sleeve 138 journaled at its outer end on a bearing 139 formed on a bracket 140 attached to the guideway 118 (see Figs. 6 and 7). On the outer end of the reduced portion 137 of the screw rod 132 is secured a knob or a handle 141 under the control of the operator to permit the latter to turn the screw rod 132 by hand whenever it is desired to do so. The sleeve 138 has its inner end provided with a split 142 and on this split portion is secured a friction disk 150 by the use of a set screw 151 which also tends to clamp the sleeve 138 in place on the reduced portion 137 of the screw rod 132. Thus when the friction disk 150 is turned in one direction a rotary motion is given to the screw rod 132 to move the jaw bases 117, 122 carrying the pairs of jaws 111, 112 and 113, 114 toward each other to clamp the shank 37 of the spoke 35 between them, and on turning the friction disk 150 in an opposite direction the screw rod 132 is reversed and the jaw bases 117, 122 are moved away from each other thus causing the pairs of jaws 111, 112 and 113, 114 to release the shank 37 of the spoke 35. The friction disk 150 is provided with a segmental slot 152 (see Figs. 10 and 11) into which projects a pin 153 attached to the right-hand end of the guideway 118, the said pin 153 and the slot 152 serving to limit the rotary motion of the friction disk 150. The outer face of the friction disk 150 is engaged by a facing 160 of leather or other suitable material glued or otherwise fastened to the face of a driven friction disk 161 mounted to rotate loosely on the sleeve 138. The hub 162 of the friction disk 161 is pressed on by one end of a spring 163 coiled on the sleeve 138 and abutting with its other end on a nut 164 screwing on a threaded portion of the sleeve 138. By adjusting the nut 164 more or less tension can be given to the spring 163 with a view to hold the driven friction disk 161 in stronger or lighter frictional contact with the friction disk 150. After the tension of the spring 163 has been adjusted by the nut 164 the latter is locked in place by a jam nut 165.

On the hub 162 is secured a pinion 170 in mesh with a longitudinally extending rack bar 171 mounted to slide in bearings 172, 173, of which the bearing 172 is arranged on the bracket 140 (see Figs. 6 and 7) and the bearing 173 is fastened to the main frame 30 (see Fig. 1). The rack bar 171 is in mesh adjacent the bearing 173 with a pinion 174 secured on a transverse shaft 175 journaled on the main frame 30. On the shaft 175 is secured a pinion 176 (see Fig. 3) in mesh with a rack bar 177 attached to a bracket 178 fastened to or forming part of the cutter head 32 to reciprocate with the same. Thus when the machine is running and the cutter head 32 reciprocates up and down then the rack bar 177 moves with the cutter head and during this downward movement it turns the pinion 176 and consequently the shaft 175 in one direction to cause the pinion 174 in mesh with the rack bar 171 to move the latter forwardly in the direction of the arrow $x$ indicated in Fig. 1. This movement of the rack bar 171 causes the pinion 170 to rotate in the direction of the arrow $x'$ whereby the friction disk 161 is rotated in the same direction and with it the friction disk 150. The rotary motion of the friction disk 150 causes the screw rod 132 to rotate to move the jaw bases 117, 122 toward each other thus causing the pairs of jaws 111, 112 and 113, 114 to clamp the shank 37 of the spoke 35. Thus prior to the knives 55 reaching the hub end 34 of the spoke 35 the latter is securely clamped in place to insure proper cutting off of the surplus material on both sides of the hub end 34 of the spoke. When the cutter head 32 ascends then the rack bar 177 turns the pinion 176 and consequently the shaft 175 in a reverse direction whereby the pinion 174 imparts a reverse sliding movement to the rack bar 171 which latter by the pinion 170 rotates the friction disk 161 in the inverse direction of the arrow $x'$ whereby the friction disk 150 is likewise turned in this direction and with it the screw rod 132 to move the jaw bases 117, 122 away from each other thus causing the pairs of jaws 111, 112 and 113, 114 to move out of clamping engagement with the shank 37 of the spoke 35. It is understood that only during a portion of the up and down movement of the cutter head 32 and the rack bar 177 the friction disk 150 is turned owing to the limited turning movement that can be given to this friction disk on account of the fixed pin 153 engaging the slot 152. The pairs of jaws 111, 112 and 113, 114 are sometimes liable to stick on the shank 37 of the spoke 35 and in order to positively start the screw rod 132 use is made of the following arrangement: On the inner face of the friction disk 150 is arranged a boss 180 in which is mounted to slide a spring catch 181 adapted to project with its beveled head 182 into the path of a lug 183 secured to the rack bar 171 (see Figs. 10 and 11). Thus when the rack bar 171 is on the return stroke in the inverse direction of the arrow (see Fig. 11) then the lug 183 engages the head 182 and thus imparts a swinging motion to the friction disk 150 in the inverse direction of the arrow $x'$. The movement given by the lug 183 to the head 182 and consequently to the friction disk 150 is sufficient to move the jaws 111, 112, 113, 114 out of clamping contact with the shank 37 of the spoke 35 to allow the driving friction disk 161 to continue the reverse rotary motion of the friction disk 150 to completely move the jaws into open position. It is understood that when the rack bar 171 starts in the direction of the arrow $x$ the friction disk 150 is in the position shown in Fig. 10, that is, with the catch 181 in an approximately horizontal position, but as this friction disk 150 is now rotated the catch 151 moves into vertical position prior to the lug 183 reaching the beveled end of the head 182, but owing to this beveled end of the head 182 the catch 181 is simply pressed upward in its boss 180 to allow the lug 183 to pass, and as soon as this is done the catch 181 is pressed downward into its normal position for engagement by the lug 183 on the return of the latter (see Fig. 11).

The operation is as follows:

When the machine is running and the cutter head 32 is in uppermost position as shown in Figs. 1 and 2 then the clamping device 110 is in open position to allow the attendant to place the spoke in position by engaging the throat 38 thereof with the combined gage and holder 90 and resting the hub end 34 on the anvil die 33 and the shank 37 on the support 80. It will be noticed that the flanges 103 by engaging the throat 38 hold the spoke in proper position and at the same time prevent lateral movement of the spoke. During the descent of the cutter head 32 the clamping device 110 is moved into closed position, as previously explained, whereby the pairs of jaws 111, 112 and 113, 114 engage and clamp opposite sides of the shank 37 of the spoke 35. The clamping action is completed prior to the knives 55 reaching the hub end 34 of the spoke so that the latter is firmly held in position during the next following shearing off operation by the cutting edges 56 on the hub end 34 of the spoke to form the miters 36. When this has been done the cutter head 32 rises and after the knives 55 have moved out of engagement with the spoke then the lug 183 during its return movement engages the head 182 of the spring catch 181 whereby the friction disk 150 is turned in the inverse direction of the arrow x' and consequently the jaws 111, 112, 113, 114 are started to unclamp the shank 37 of the spoke 35, the complete unclamping taking place immediately after by the friction disk 161 turning the friction disk 150 in the inverse direction of the arrow x' until the end of the slot 152 is in engagement with the fixed pin 153, as shown in Fig. 10. The rotary motion of the friction disk 150 then ceases while the friction disk 161 keeps on turning until the cutter head 32 has reached the end of its upward stroke. During the upward movement of the cutter head 32 after the spoke has been unclamped by the clamping device 110, the attendant in charge removes the finished spoke and places another in position on the anvil die 33, the combined gage and holder 90 and the support 80, as above explained, and the above operation is then repeated.

It is understood that during about the first half of the downward movement of the cutter head 32, the friction disk 150 is turned by the friction disk 161 to cause the jaws 111, 112, 113, 114 to clamp the spoke 35 in place. During the remainder of the downward movement of the cutter head 32 the friction disk 150 remains at a standstill while the friction disk 161 keeps on turning and the lug 183 moves beyond the catch 181 (see Fig. 11). Thus the spoke 35 is clamped in position prior to the cutting knives 55 reaching the hub end 34 of the spoke 35 to miter the same. During the first portion of the upward movement of the cutter head 32 the jaws 111, 112, 113 and 114 remain closed by the frictional contact of the jaws on the spoke being greater than that of the friction disks 161, 150 and after the cutting edges 56 of the knives 55 have cleared the top of the hub end 34 then the lug 183 on its return movement engages the head 182 of the catch 181 whereby the friction disk 150 is started to move the jaws out of engagement with the shank 37 of the spoke 35. The jaws are next moved into full open position by the friction disk 161 turning the friction disk 150 until the end of the slot 152 engages the fixed pin 153 as shown in Fig. 10. The friction disk 150 now remains at a standstill while the friction disk 161 keeps on turning until the cutter head reaches the end of its upward stroke.

When the spokes are used in the production of straight wheels then the top of the support 80 is level with the top of the anvil die 33 to support the spoke 35 in a horizontal position with a view to cause the knives 55 to produce the mitered sides 36 shown in Fig. 25. It will be noted that each side 36 has its top and bottom edges of the same length and the spokes when placed in the hub of the wheel extend in a vertical plane. When the spokes are intended for a dished wheel the support 80 is raised and the anvil die 33 is tilted (see dotted lines in Fig. 5) to support the spoke in a correspondingly inclined position to cause the knives 55 to produce the mitered sides 36 shown in Fig. 26, and which mitered sides 36 have their lower edges shorter than the top edges so that when the spokes are placed in the hub of a wheel they extend in the surface of a cone, the axis of which coincides with the axis of the wheel.

When it is desired to give to the terminal 39 of the hub end 34 a segmental shape, as shown in Fig. 24, then use is made of an additional knife 190 (see Figs. 14, 15 and 16) which is adjustably fastened to the cutter head 32 in the rear of the knives 55 and extending across the same. The cutting edge 191 of this knife 190 is preferably V-shaped and its face 192 is made segmental (see Fig. 14) to give a curved shape to the terminal 39 of the spoke 35 at the time the surplus material is cut off from the sides of the hub end 34 by the knives 55, as previously explained.

Instead of a separate knife 190, one of the knives 55 may be provided at its rear end with an integral, angularly extending knife 195 (see Figs. 17, 19 and 20) extending across to the other knife and similar in shape, as to its cutting edge 196 and its arched face 197, to the knife 190 above described.

Having thus described our invention, we claim as new and desire to secure by Letters Patent:—

1. In a spoke mitering machine, a vertically reciprocating cutter head having a cutter provided with converging cutting edges, a stationary anvil die for the end of a spoke to rest on and having converging sides coöperating with the said cutting edges to cut off the surplus material simultaneously on both sides of the said hub end, sets of laterally operating jaws adapted to clamp the shank of the spoke at the sides thereof while the hub end thereof rests on the said anvil die, and mechanism connecting the said jaws with the said cutter head.

2. In a spoke mitering machine, a reciprocating cutter head having a cutter provided with converging cutting edges, a stationary anvil die for the hub end of a spoke to rest on and having converging sides coöperating with the said cutting edges to cut off the surplus material simultaneously on both sides of the said hub end, a clamping device in front of the said anvil die and adapted to clamp the shank of the spoke in place while the hub end thereof rests on the said anvil die, the said clamping device moving in unison with the said cutter head, and a holding and gaging means intermediate the anvil die and the said clamping device and adapted to be engaged by the throat of the spoke.

3. In a spoke mitering machine, a reciprocating cutter head having a cutter provided with converging cutting edges, a stationary anvil die for the hub end of a spoke to rest on and having converging sides coöperating with the said cutting edges to cut off the surplus material simultaneously on both sides of the said hub end, a clamping device in front of the said anvil die and adapted to clamp the shank of the spoke in place while the hub end thereof rests on the said anvil die, the said clamping device moving in unison with the said cutter head, and a combined holder and gage intermediate the anvil die and the said clamping jaws and adapted to be engaged by the throat of the spoke, the holder and gage having rising side members terminating in arms extending toward the sides of the anvil die at the widest part thereof.

4. In a spoke mitering machine, a reciprocating cutter head having a cutter provided with converging cutting edges, a stationary anvil die for the hub end of a spoke to rest on and having converging sides coöperating with the said cutting edges to cut off the surplus material simultaneously on both sides of the said hub end, clamping jaws adapted to clamp the shank of the spoke between them, actuating means moving the jaws toward and from each other, and a friction drive actuated and controlled from the said cutter head and connected with the said actuating means to move the jaws toward each other and clamp the spoke prior to the cutter acting on the hub end and to move the jaws apart during the return movement of the cutter head.

5. In a spoke mitering machine, a reciprocating cutter head having a cutter provided with converging cutting edges, a stationary anvil die for the hub end of a spoke to rest on and having converging sides coöperating with the said cutting edges to cut off the surplus material simultaneously on both sides of the said hub end, clamping jaws adapted to clamp the shank of the spoke between them, means moving the jaws toward and from each other, and a friction drive actuated and controlled from the said cutter head and connected with the said actuating means to move the jaws toward and from each other, the said friction drive having two contacting friction disks of which one is rotated alternately in opposite directions during the descent and ascent of the cutter head, and limiting means to limit the turning movement of the other friction disk.

6. In a spoke mitering machine, a reciprocating cutter head having a cutter provided with converging cutting edges, a stationary anvil die for the hub end of a spoke to rest on and having converging sides coöperating with the said cutting edges to cut off the surplus material simultaneously on both sides of the said hub end, clamping jaws adapted to clamp the shank of the spoke between them, a screw rod mounted to turn and having right and left hand screw threads screwing in the said jaws to move the latter toward and from each other, contacting friction disks of which one is secured on the said screw rod, and a gearing rotating the other friction disk alternately in opposite directions and connected with the said reciprocating cutter head.

7. In a spoke mitering machine, a reciprocating cutter head having a cutter provided with converging cutting edges, a stationary anvil die for the hub end of a spoke to rest on and having converging sides coöperating with the said cutting edges to cut off the surplus material simultaneously on both sides of the said hub end, clamping jaws adapted to clamp the shank of the spoke between them, a screw rod mounted to turn and provided with right and left hand screw threads screwing in the said jaws to move the latter toward and from each other, a screw rod friction disk secured on the said screw rod and provided with a slot, a fixed pin extending into the said slot to limit the turning motion thereof, a driven friction disk in frictional contact with the said screw rod friction disk, and a gearing driven from the said cutter head and connected with the said driven friction disk to rotate the latter alternately in opposite directions.

8. In a spoke mitering machine, a reciprocating cutter head having a cutter provided with converging cutting edges, a stationary anvil die for the hub end of a spoke to rest on and having converging sides coöperating with the said cutting edges to cut off the surplus material simultaneously on both sides of the said hub end, clamping jaws adapted to clamp the shank of the spoke between them, a screw rod mounted to turn and provided with right and left hand screw threads screwing in the said jaws to move the latter toward and from each other, a screw rod friction disk secured on the said screw rod and provided with a slot, a fixed pin extending into the said slot to limit the turning movement thereof, a driven friction disk in frictional contact with the said screw rod friction disk, a gearing driven from the said cutter head and connected with the said driven friction disk to rotate the latter alternately in opposite directions, the said gearing including a reciprocating rack bar and a pinion on the said driven friction disk, a spring catch on the said screw rod friction disk, and a lug on the said rack bar adapted to engage the said spring catch to positively turn the said screw rod friction disk on the return movement of the rack bar.

9. In a spoke mitering machine, a vertically reciprocating cutter head, an anvil die adapted to support the hub end of a spoke and coacting with the said cutter head to simultaneously miter both sides of the said hub end, a gage adjacent the anvil die and adapted to support the throat of the spoke, a support for the shank of the spoke to rest on, and a clamping device adapted to engage opposite sides of the spoke shank to clamp the latter in position.

10. In a spoke mitering machine, a vertically reciprocating cutter head, an anvil die adapted to support the hub end of a spoke and coacting with the said cutter head to simultaneously miter both sides of the said hub end, a holder adjacent the anvil die and adapted to support the throat of the spoke, a support for the shank of the spoke to rest on, a clamping device adapted to engage opposite sides of the spoke shank to clamp the latter in position, and means for adjusting the said support and fasten the same in place after the adjustment is made.

11. In a spoke mitering machine, a vertically reciprocating cutter head, an anvil die adapted to support the hub end of a spoke and coacting with the said cutter head to simultaneously miter both sides of the said hub end, a holder adjacent the anvil die and adapted to support the throat of the spoke, a support for the shank of the spoke to rest on, a clamping device adapted to engage opposite sides of the spoke shank to clamp the latter in position, and means opening and closing the said clamping device and moving in unison with the said reciprocating cutter head.

12. In a spoke mitering machine, a reciprocating cutter head, an anvil die coacting with the said cutter head to miter the sides of the hub end of a spoke, the said hub end being adapted to rest on the said anvil die, and a combined holder and gage adjacent the said anvil die and adapted to be engaged by the throat of the spoke to hold the hub end in proper position on the anvil die.

13. In a spoke mitering machine a reciprocating cutter head, an anvil die coacting with the said cutter head to miter the sides of the hub end of a spoke, the said hub end being adapted to rest on the said anvil die, a combined holder and gage adjacent the said anvil die and adapted to be engaged by the throat of the spoke to hold the hub end in proper position on the anvil die, and manually controlled adjusting means engaging the said combined holder and gage to adjust the latter nearer to or farther from the said anvil die.

14. In a spoke mitering machine, a reciprocating cutter head, an anvil die coacting with the said cutter head to miter the sides of the hub end of a spoke, the said hub end being adapted to rest on the said anvil die, a combined holder and gage adjacent the said anvil die and adapted to be engaged by the throat of the spoke to hold the hub end in proper position on the anvil die, and a support in alinement with the said combined holder and gage and the said anvil die to support the shank of the spoke.

15. In a spoke mitering machine, a reciprocating cutter head, an anvil die coacting with the said cutter head to miter the sides of the hub end of a spoke, the said hub end being adapted to rest on the said anvil die, a combined holder and gage adjacent the said anvil die and adapted to be engaged by the throat of the spoke to hold the hub end in proper position on the anvil die, a support in alinement with the said combined holder and gage and the said anvil die to support the shank of the spoke, and manually controlled adjusting means for adjusting the support in an up or down direction.

16. In a spoke mitering machine, a reciprocating cutter head, an anvil die for the hub end of a spoke to rest on and coacting with the said cutter head to miter the sides of the said hub end, clamping jaws adapted to clamp the shank of the spoke between them, a right and left hand screw rod engaging the jaws to move the same into and out of clamping position, a friction drive for the said screw rod and connected with and actuated from the said cutter head, the said friction drive having means to turn the screw rod in one direction during the first half portion of the downward movement of the cutter head and to turn the screw rod in a reverse direction after the cutter head has closed the hub end during its upward movement.

17. In a spoke mitering machine, a reciprocating cutter head, an anvil die for the hub end of a spoke to rest on and coacting with the said cutter head to miter the sides of the said hub end, clamping jaws adapted to clamp the shank of the spoke between them, a right and left hand screw rod engaging the jaws to move the same into and out of clamping position, contacting friction disks of which one is secured to the said screw rod and the other is mounted to rotate loosely thereon, a pinion secured to the said loosely mounted friction disk, a rack bar in mesh with the said pinion, a transverse shaft provided with two pinions of which one is in mesh with the said rack bar, and a second rack bar secured on the said cutter head and in mesh with the other pinion on the said shaft.

18. In a spoke mitering machine, a reciprocating cutter head, an anvil die for the hub end of a spoke to rest on and coacting with the said cutter head to miter the sides of the said hub end, clamping jaws adapted to clamp the shank of the spoke between them, a right and left hand screw rod engaging the jaws to move the same into and out of clamping position, contacting friction disks of which one is secured to the said screw rod and the other is mounted to rotate loosely thereon, a pinion secured to the said loosely mounted friction disks, a rack bar in mesh with the said pinion, a transverse shaft provided with two pinions of which one is in mesh with the said rack bar, a second rack bar secured on the said cutter head and in mesh with the other pinion on the said shaft, and means to limit the rotary motion of the said friction disk fixed on the screw rod.

19. In a spoke mitering machine, a reciprocating cutter head, an anvil die for the hub end of a spoke to rest on and coact with the said cutter head to miter the sides of the said hub end, clamping jaws adapted to clamp the shank of the spoke between them, a right and left hand screw rod engaging the jaws to move the same into and out of clamping position, contacting friction disks of which one is secured to the said screw rod and the other is mounted to rotate loosely thereon, a pinion secured to the said loosely mounted friction disk, a rack bar in mesh with the said pinion, a transverse shaft provided with two pinions of which one is in mesh with the said rack bar, a second rack bar secured on the said cutter head and in mesh with the other pinion on the said shaft, a lug on the said rack bar, and a spring catch on the friction disk fixed on the screw rod, the said spring catch extending into the path of the said lug during the return movement of the said cutter head.

GEORGE A. ENSIGN.
JOHN C. M. DES ISLETS.

Copies of this patent may be obtained for five cents each, by addressing the "Commissioner of Patents, Washington, D. C."